United States Patent
Kumar et al.

(10) Patent No.: US 11,425,056 B1
(45) Date of Patent: Aug. 23, 2022

(54) DYNAMIC COMPUTATION OF SR-TE POLICY FOR SR-ENABLED DEVICES CONNECTED OVER NON-SR-ENABLED DEVICES

(71) Applicant: Juniper Networks, Inc., Sunnyvale, CA (US)

(72) Inventors: Sunil Kumar, Bangalore (IN); Hariharan Boopathy, Bangalore (IN); Vinod Kumar N, Bangalore (IN); Ramakrishnan Shanmuga Sundaram, Chennai (IN)

(73) Assignee: Juniper Networks, Inc., Sunnyvale, CA (US)

( * ) Notice: Subject to any disclaimer, the term of this patent is extended or adjusted under 35 U.S.C. 154(b) by 143 days.

(21) Appl. No.: 16/795,493

(22) Filed: Feb. 19, 2020

(51) Int. Cl.
  *H04L 12/00* (2006.01)
  *H04L 49/00* (2022.01)
  (Continued)

(52) U.S. Cl.
  CPC .......... *H04L 49/3009* (2013.01); *H04L 43/10* (2013.01); *H04L 45/34* (2013.01); *H04L 45/50* (2013.01); *H04L 47/125* (2013.01)

(58) Field of Classification Search
  CPC ......... H04L 45/50; H04L 45/74; H04L 45/34; H04L 69/22; H04L 43/10; H04L 12/4633; H04L 45/02; H04L 45/64; H04L 45/507; H04L 45/22; H04L 45/28; H04L 45/04; H04L 45/745
  See application file for complete search history.

(56) References Cited

U.S. PATENT DOCUMENTS 10,382,592 B2  8/2019  Paul et al.
2015/0256456 A1  9/2015  Previdi et al.
(Continued)

FOREIGN PATENT DOCUMENTS

WO  2017141079 A1  8/2017

OTHER PUBLICATIONS

Previdi et al., "Source Packet Routing in Networking (SPRING) Problem Statement and Requirements," RFC 7855, Internet Engineering Task Force, IETF, May 2016, 19 pp.
(Continued)

*Primary Examiner* — Phuc H Tran
(74) *Attorney, Agent, or Firm* — Shumaker & Sieffert, P.A.

(57) ABSTRACT

Techniques are described for dynamically computing a segment routing policy for a segment routing for traffic engineering (SR-TE) path. For example, in a discontinuous SR network in which SR islands (e.g., groups of neighboring routers that are enabled for segment routing) are separated by one or more routers not enabled for segment routing, instead of returning a failure because one or more routers along a path are not enabled for SR, an ingress router may generate an SR-TE operations, administrations, and management (OAM) Multi-Protocol Label Switching (MPLS) traceroute packet send the packet to a first border router of the RSVP-enabled devices along a computed path to trigger the creation of a resource reservation Label Switched Path (LSP) through the RSVP-enabled devices. In this way, segment routed LSP may be established to tunnel through the resource reservation LSP for a SR-TE path used in an SR-TE policy.

22 Claims, 5 Drawing Sheets

(51) Int. Cl.
*H04L 45/00* (2022.01)
*H04L 43/10* (2022.01)
*H04L 45/50* (2022.01)
*H04L 47/125* (2022.01)

(56) References Cited

U.S. PATENT DOCUMENTS

| | | | |
|---|---|---|---|
| 2016/0006614 A1 | 1/2016 | Zhao | |
| 2016/0021000 A1 | 1/2016 | Previdi et al. | |
| 2016/0173366 A1 | 6/2016 | Saad et al. | |
| 2016/0218961 A1* | 7/2016 | Lindem, III | H04L 12/4633 |
| 2017/0149685 A1 | 5/2017 | Wu et al. | |
| 2019/0020738 A1* | 1/2019 | Paul | H04L 45/58 |
| 2019/0058657 A1 | 2/2019 | Chunduri et al. | |
| 2019/0280960 A1* | 9/2019 | Ceccarelli | H04L 45/124 |
| 2020/0328971 A1* | 10/2020 | Bashandy | H04L 49/35 |

OTHER PUBLICATIONS

Filsfils et al., "Segment Routing Architecture draft-filsfils-rtgwg-segment-routing-00," Internet-Draft, Network Working Group, Jun. 28, 2013, 28 pp.

Filsfils et al., "Segment Routing Use Cases draft-filsfils-rtgwg-segment-routing-use-cases-01," Internet-Draft, Network Working Group, Jul. 14, 2013, 46 pp.

Filsfils et al., "Segment Routing Architecture draft-filsfils-spring-segment-routing-04," Internet-Draft, Network Working Group, Jul. 3, 2014, 18 pp.

Filsfils et al., "Segment Routing with MPLS data plane draft-filsfils-spring-segment-routing-mpls-03," Internet-Draft, Network Working Group, Jul. 31, 2014, 14 pp.

Awduche et al., "RSVP-TE: Extensions to RSVP for LSP Tunnels," RFC 3209, Network Working Group, Dec. 2001, 61 pp.

Vasseur et al., "Path Computation Element (PCE) Communication Protocol (PCEP)," RFC 5440, Network Working Group, Mar. 2009, 87 pp.

Enns et al., "Network Configuration Protocol (NETCONF)," RFC 6241, Internet Engineering Task Force, IETF, Jun. 2011, 113 pp.

Moy, "OSPF Version 2," RFC 2328, Network Working Group, Apr. 1998, 244 pp.

Coltun et al., "OSPF for IPv6," RFC 5340, Network Working Group, Jul. 2008, 94 pp.

Sheth et al., "OSPF Hybrid Broadcast and Point-to-Multipoint Interface Type," RFC 6845, Internet Engineering Task Force, IETF, Jan. 2013, 9 pp.

Lindem et al., "OSPFv3 LSA Extendibility draft-acee-ospfv3-lsa-extend-01.txt," Internet-Draft, Network Working Group, Jul. 15, 2013, 27 pp.

Oran, "OSIIS-IS Intra-domain Routing Protocol," RFC 1142, Network Working Group, Feb. 1990, 157 pp.

Li et al., "IGP Requirements for Traffic Engineering with MPLS draft-li-mpls-igp-te-00.txt," Internet-Draft, Network Working Group, Feb. 1999, 6 pp.

Shakir et al., "Performance Engineered LSPs using the Segment Routing Data-Plane", IETF. (Year: 2013).

Filsfils et al., "Segment Routing interworking with LDP", IETF. (Year: 2017).

Kompella et al., "Detecting Multiprotocol Label Switched (MPLS) Data-Plane Failures," RFC 8029, Internet Engineering Task Force (IETF), Mar. 2017, 79 pp.

Kumar et al., "Label Switched Path (LSP) Ping/Traceroute for Segment Routing (SR) IGP-Prefix and IGP-Adjacency Segment Identifiers (SIDs) with MPLS Data Planes," RFC 8287, Internet Engineering Task Force (IETF), Dec. 2017, 26 pp.

* cited by examiner

DYNAMIC COMPUTATION OF SR-TE POLICY FOR SR-ENABLED DEVICES CONNECTED OVER NON-SR-ENABLED DEVICES

TECHNICAL FIELD

The disclosure relates to computer networks and, more particularly, to engineering traffic flows within computer networks.

BACKGROUND

A computer network is a collection of interconnected computing devices that exchange data and share resources. In a packet-based network, such as the Internet, computing devices communicate data by dividing the data into small blocks called packets, which are individually routed across the network from a source device to a destination device. The destination device extracts the data from the packets and assembles the data into its original form.

Certain devices within the network, referred to as routers, use routing protocols to exchange and accumulate topology information that describes the network. This allows a router to construct its own routing topology map of the network. Upon receiving an incoming data packet, the router examines keying information within the packet and forwards the packet in accordance with the accumulated topology information.

Packet-based networks may use label switching protocols for traffic engineering and other purposes. Multi-Protocol Label Switching (MPLS) is a mechanism used to engineer traffic patterns within Internet Protocol (IP) networks according to the routing information maintained by the routers in the networks. By utilizing protocols such as the Label Distribution protocol (LDP), the Resource Reservation Protocol (RSVP) with Traffic Engineering extensions (RSVP-TE), or the Segment Routing (SR) extension, label switching routers can forward traffic along a particular path through a network to a destination device, i.e., a Label Switched Path (LSP), using labels prepended to the traffic. An LSP defines a distinct path through the network to carry MPLS packets from the source device to a destination device. With some MPLS techniques, each router along an LSP allocates a label in association with the destination and propagates the label to the closest upstream router along the path. Routers along the path add (push), remove (pop) or swap the labels and perform other MPLS operations to forward the MPLS packets along the established path.

In some cases, routers may employ segment routing techniques. To forward a packet through the network, the routers may push, pop, or swap one or more labels in a label stack, e.g., a segment list, that is applied to the packet as it is forwarded through the network. Segment routing for traffic engineering (SR-TE) uses policies to route traffic through a network. An SR-TE policy path may include a list of segments that specify the path. This list may be referred to as a segment ID (SID) list. When a packet is received by an ingress router, the ingress router may push the SID list onto the packet under the SR-TE policy such that the rest of the network may use the information embedded in the SID list to route the packet.

SUMMARY

In general, techniques are described for dynamically computing a segment routing policy for a segment routing for traffic engineering (SR-TE) path. For example, in a contiguous SR network (e.g., a network of SR enabled devices), an ingress router may dynamically establish the SR-TE policy as needed to route one or more packets through the SR network. In mixed SR/non-SR networks (e.g., having SR islands separated by RSVP-enabled devices), an ingress router may be unable to dynamically compute an SR-TE policy that includes RSVP-enabled devices within a segment. For example, in a discontinuous SR network in which SR islands (e.g., groups of neighboring routers that are enabled for segment routing) are separated by one or more routers not enabled for segment routing (e.g., Resource Reservation Protocol (RSVP) enabled network devices), instead of returning a failure because one or more routers along a path are not enabled for SR, the ingress router may generate an SR-TE operations, administrations, and management (OAM) Multi-Protocol Label Switching (MPLS) traceroute packet and send the packet to a first RSVP/SR border router of the RSVP-enabled devices along a computed path. The SR-TE MPLS OAM traceroute packet may include, for example, a list of SR routers along the computed path towards Protocol Next-Hop (PNH) of service route, and a flag to trigger dynamic, on-demand creation of a resource reservation Label Switched Path (LSP) through the RSVP-enabled devices along the computed path. The first border router of the RSVP-enabled devices may receive the SR-TE MPLS OAM traceroute packet from the ingress router and, in response, create the resource reservation LSP from the first border to a second border router of the RSVP-enabled devices. In this way, segment routed LSP may be established to tunnel through the resource reservation LSP for a SR-TE path used in an SR-TE policy.

In one example, a method includes receiving, by a network device, a service route specifying a destination device as a protocol next hop; calculating, by the network device in response to determining that a routing table of the network device does not contain an entry for the destination device, a segment routing policy specifying a path toward the destination device; determining, by the network device, that one or more network devices of a plurality of network devices along the path are not enabled for segment routing (SR); in response to determining that the one or more network devices are not enabled for SR, generating a packet including an SR node list specifying one or more SR-enabled network devices along the path and an indication that a non-SR Label Switched Path (LSP) through the one or more network devices is needed; and forwarding, by the network device, the packet along the path to a border device enabled for SR that is adjacent to at least one of the one or more network devices along the path that are not enabled for SR.

In another example, a method includes receiving, by a first border device of a plurality of devices in a network, a packet from a network device, wherein one or more network devices of the plurality network devices are not enabled for segment routing (SR); identifying, by the first border device, an indication in the packet that a non-SR Label Switched Path (LSP) through the network is needed, wherein the packet includes an SR node list; establishing, by the first border device and based on the SR node list, the non-SR LSP through the one or more network devices to a second border device of the network; and in response to determining the non-SR LSP has been established, forwarding, by the first border device to the network device, a reply packet indicating that the non-SR LSP was successfully created.

In another example, a network device includes processing circuitry coupled to a memory device, wherein the network device is configured to: receive a service route specifying a destination address as a protocol next hop; calculate, in response to determining that a routing table of the network device does not contain an entry for the destination address, a segment routing policy specifying a path toward the destination address; determine that one or more network devices of a plurality of network devices along the path are not enabled for segment routing (SR); in response to determining that the one or more network devices are not enabled for SR, generate a packet including an SR node list specifying one or more SR-enabled network devices along the path and an indication that a non-SR Label Switched Path (LSP) through the one or more network devices is needed; and forward the packet along the path to a border device enabled for SR that is adjacent to at least one of the one or more network devices along the path that are not enabled for SR.

In another example, a border device includes processing circuitry coupled to a memory device, wherein the border device is configured to: receive a packet from a network device; identify an indication in the packet that a non-SR Label Switched Path (LSP) through one or more network devices not enabled for segment routing (SR) is needed, wherein the packet includes an SR node list; establish, based on the SR node list, a non-SR LSP through the one or more network devices to a second border device; and in response to determining the non-SR LSP has been established, forward, to the network device, a reply packet indicating that the non-SR LSP was established.

The details of one or more examples are set forth in the accompanying drawings and the description below. Other features, objects, and advantages will be apparent from the description and drawings, and from the claims.

DETAILED DESCRIPTION

Figure 1:
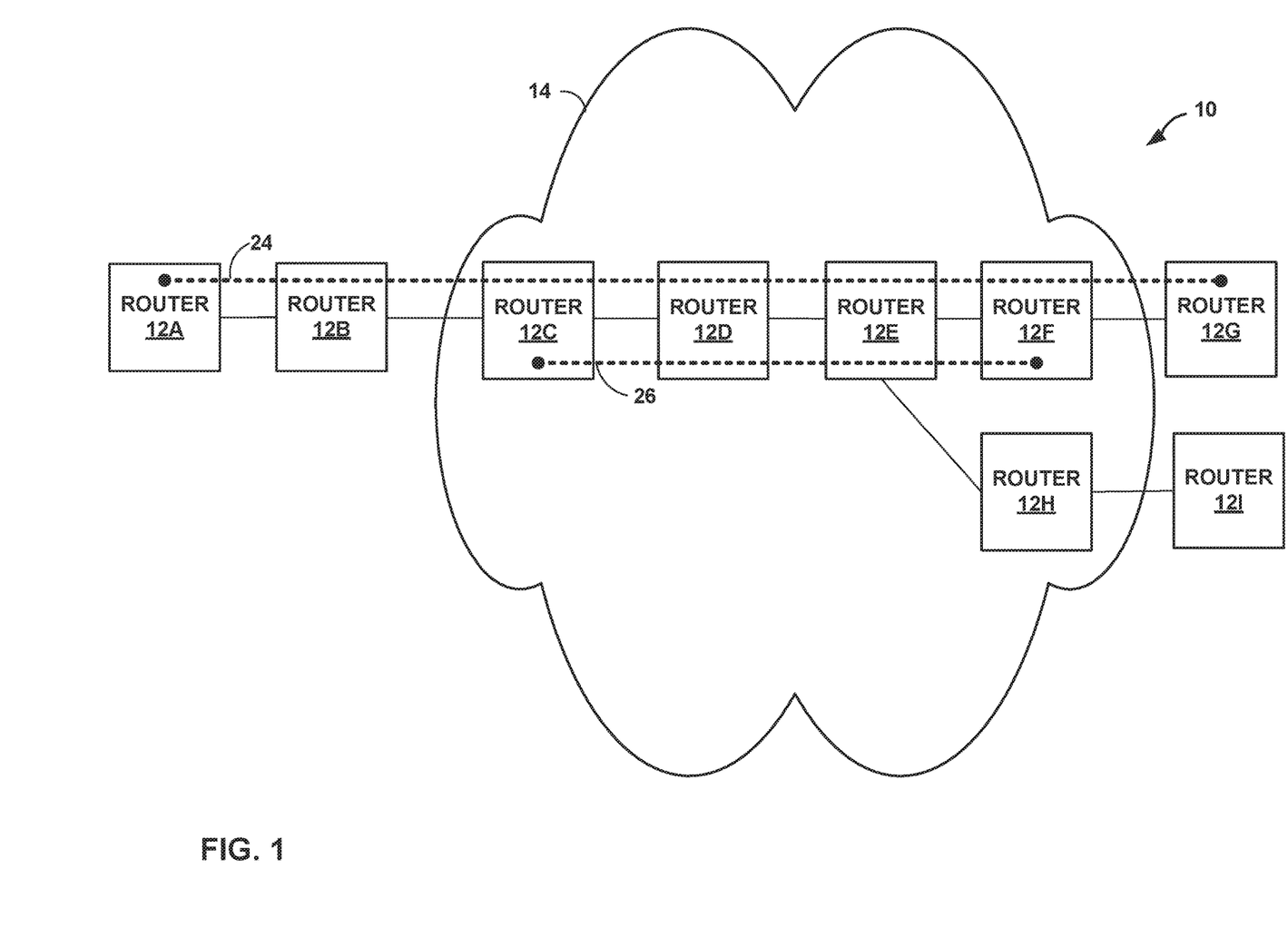
FIG. 1 is a block diagram illustrating an example system having network devices configured to operate in accordance with techniques described in this disclosure.

FIG. 1 is a block diagram illustrating an example system 10 having network devices configured to operate in accordance with techniques described in this disclosure. In particular, system 10 includes routers configured for automatically establishing a segment routed Label Switched Path (LSP) through a resource reservation LSP (e.g., an RSVP-TE LSP) that has been automatically established on demand over one or more routers are not enabled for segment routing. System 10 may include routers 12A-12I ("routers 12") to establish an LSP configured with a resource reservation protocol or segment routing protocol.

The sources of the network traffic received by ingress router 12A may include one or more devices (not shown) and/or any public or private network or the Internet that provides traffic to ingress router 12A. The destinations of the network traffic being forwarded on LSPs may include one or more destination devices and/or network that may include LANs or wide area networks (WANs) that include a plurality of devices. For example, destination devices may include personal computers, laptops, workstations, personal digital assistants (PDAs), wireless devices, network-ready appliances, file servers, print servers or other devices that access the source.

In the example of FIG. 1, routers 12 may use segment routing techniques for establishing an SR-LSP (e.g., Source Packet Routing in Networking (SPRING) protocol). For example, segment routing techniques are used to configure labels for paths from ingress router 12A to egress router 12G and/or from ingress router 12A to egress router 12I. In some examples, router 12G or router 12I may be referred to as destination routers or devices. Segment routing within an IGP domain allows routers to advertise single or multi-hop LSPs within the IGP domain such as a segment routing LSP. For segment routing, the "path" information is disseminated between the routers as part of the IGP link state information for the domain. Routers are able to steer packets through a controlled set of instructions, called segments, by prepending a segment routing header (e.g., label) to the packets. Segment routing allows routers to enforce a flow through any topological path and service chain while maintaining per-flow state only at the ingress node to the segment routing domain.

One potential advantage of segment routing may be that the segment routing architecture can be directly applied to the Multi-protocol Label Switching (MPLS) data plane with no change in the forwarding plane. Only one node segment needs to be allocated per router and the segment routing Interior Gateway Protocol (IGP) control-plane automatically builds the required MPLS forwarding constructs from a router to any other router. Segment routing is further described in Filsfils et. al., "Segment Routing Architecture," Internet-Draft draft-filsfils-rtgwg-segment-routing-00, June 2013, while Segment Routing use cases are described in Filsfils et. al., "Segment Routing Use Cases," Internet-Draft draft-filsfils-rtgwg-segment-routing-use-cases-01, July 2013, the entire contents of each of which are incorporated herein by reference. Further details regarding SPRING are found in (1) "Segment Routing Architecture," IETF draft: draft-filsfils-spring-segment-routing-04, Jul. 3, 2014; (2) S. Previdi, et al., "Source Packet Routing in Networking (SPRING) Problem Statement and Requirements," RFC 7855, May 201; and (3) "Segment Routing with MPLS data plane," IETF draft: draft-filsfils-spring-segment-routing-mpls-03, Aug. 1, 2014, the entire contents of each of which are incorporated by reference herein.

In the example of FIG. 1, routers 12 that are included in a segment routing domain may exchange labels. Routers 12 operate as label switching routers (LSRs) that distribute labels to neighboring LSRs within system 10 under an SR-TE policy. For example, the SR-TE policy may include multiple different label types including "adjacency" labels and "node" labels. To forward a packet through system 10, routers that are enabled for SR may push, pop, or swap one or more labels in a label stack (e.g., a "segment list") that is applied to the packet as it is forwarded through the network. The label stack may encode the topological and service source route of the packet under the SR-TE policy.

An adjacency label may have a local semantic to a particular segment routing node, such as one of routers 12. In particular, an adjacency label steers traffic onto an adjacency (e.g., communication link and/or interface) or set of adjacencies. Thus, an adjacency label may be related to a particular router. To use an adjacency label, a router may initially assign the adjacency label to a particular adjacency and advertise the adjacency label to other routers in the segment routing domain using Intermediate System—Intermediate System (ISIS) protocol or the Open Shortest Path First (OSPF) protocol. The router may be the only router in the segment routing domain to use the particular adjacency label. When a router forwards a packet using the adjacency label, the router may cause the packet to use the adjacency for the router associated with the adjacency label. In this way, adjacency labels may be used to establish one-hop tunnels within system 10 under the SR-TE policy.

A node label, by contrast, may have a global semantic within a segment routing domain. That is, each of routers 12 that are SR-enabled may be assigned a defined node label range (commonly referred to as Segment Routing Global Block (SRGB)) that is unique to each respective router within the segment routing domain. An operator of system 10 may ensure unique allocation of the different node label ranges from a global range to different routers. In addition to a node label range, each particular router may also have a specific node identifier that uniquely identifies the particular router in the segment routing domain. Each respective router may advertise its respective node identifier and node label range to other routers in the segment routing domain using ISIS or OSPF.

Based on routes determined using, e.g., shortest path routing, each of routers 12 may configure its forwarding state to push, pop, or swap node labels (corresponding to other nodes in the network) onto packets to forward such packets using the determined route to the destination. For instance, each of routers 12 may perform path selection using topology information learned by way of IGP to compute a shortest path within system 10 on a hop-by-hop basis based on the routing information maintained by the routers. Each of routers 12 may then select a next hop along the locally computed shortest path and install forwarding information associated with the selected next hop in a forwarding plane of the router, wherein the forwarding information identifies a network interface to be used when forwarding traffic and one or more labels to be applied when forwarding the traffic out the interface. The routers use the next hops with the assigned labels to forward traffic hop-by-hop.

To illustrate the use of node labels, egress router 12G may typically advertise its node segment identifier (node SID) to each of routers 12. Each of routers 12A-12F may typically install the node SID in its forwarding state. Router 12A may inject a packet into system 10 that is destined for router 12G with the node SID for router 12G. Router 12A determines, based on a node label associated with the node SID for router 12G, that a shortest path to router 12G includes router 12B as the next-hop. Router 12A may apply a node label that indicates the node identifier for router 12G, and the node label may be within a label range assigned to 12B. In some examples, the node label is encoded to indicate both the node identifier and that the label is within a particular label range. Upon receiving the packet, router 12B may determine, based on the node label and stored forwarding information, a forwarding action. As an example, router 12B may determine that the forwarding information indicates a forwarding action of swapping the node label, which was previously applied by router 12A, for a label that indicates the node identifier for router 12G, and the new label may be within a label range assigned to 12C. In some examples, forwarding action indicates the node label is swapped for an identical node label. The packet is processed and forwarded in a similar manner by each of routers 12 on the path from router 12A to router 12G. When router 12G receives the packet, router 12G may pop the node label from the packet and forward the packet to the destination. In this way, any router in the segment routing domain may forward a packet to any other router in the network by applying the appropriate node label.

In some examples, ingress router 12A may compute and configure an SR-TE policy with an end-to-end SR-LSP 24 from router 12A to router 12G (e.g., when routers 12A through 12G are enabled for SR). For example, ingress router 12A may store the shortest path from ingress router 12A to egress router 12G and dynamically create the SR-LSP 24 to router 12G. However, in some examples, one or more of routers 12 in the shortest path may not be enabled for SR. For example, routers 12A and 12B may form a segment routing island and routers 12G and 12I may form another segment routing island. Routers in a segment routing island are defined as routers for which any router in a given segment routing island can reach any other router in the segment routing island without traversing a router that is not enabled for segment routing. Routers outside the segment routing island are either not enabled for segment routing, or must traverse an intermediate hop router that is not enabled for segment routing to reach a router within the segment routing island. For illustration purposes, routers 12D and 12E are enabled for Resource Reservation Protocol (RSVP) and not for SR. Border routers 12C, 12F, and 12H of RSVP-enabled devices network 14 represent RSVP/SR border routers that may be enabled for both RSVP and SR.

Routers 12, using a link-state routing protocol within a routing domain (e.g., an IGP routing domain), typically maintain a traffic engineering database (TED), such as a link state database (LSDB), for storing link-state information about nodes, links and paths within a given area referred to as the routing domain. Attributes stored in these traffic engineering databases for an IGP domain typically include, but are not limited to, ingress/egress IP addresses for the path, a list of explicit route objects (EROs), a backup ERO list, a list of supported hop-by-hop algorithms, and hop-by-hop label ranges. In some examples, routers that support SR also store in the TED segment identifier (SID) information, including node segment identifiers (Node SIDs) or adjacency segment identifiers (adjacency SIDs). Examples of SIDs include an MPLS label, an index value in an MPLS label space, and an Internet Protocol (IP) address of the node. Ingress router 12A may determine the non-existence of SID information of routers 12D and 12E to determine that they are not enabled for SR.

In accordance with the techniques described herein, rather than failing to establish an SR-TE policy for an end-to-end SR-LSP from ingress router 12A to egress router 12G when routers 12D 12E along the shortest path are not enabled for SR, ingress router 12A generates a request packet (e.g., an SR-TE MPLS OAM packet) and send the packet to a first border router of the RSVP-enabled devices along a computed path. The request packet may include a list of SR-enabled routers 12 toward router 12G and an indication (e.g., a flag) to trigger the dynamic, on-demand creation of a resource reservation Label Switched Path (LSP) through the RSVP-enabled devices along the computed path. For example, routers 12C, 12F, and 12H may be border routers that are enabled for both SR and for RSVP, and the list may include any combination of routers 12B, 12C, 12F, and/or 12G. In some examples, the list may be an Explicit Route Object (ERO) that specifies the one or more SR-enabled network devices as loose hops (e.g., routers 12B, 12C, 12F, and/or 12G).

In response to receiving the request packet, the control plane of border router 12C may detect the indication to trigger dynamic, on-demand creation of RSVP LSP 26 and the list of SR-enabled routers 12 along a computed path. Border router 12C may establish an RSVP LSP 26 along the computed path across the non-SR-enabled routers 12D and 12E from router 12C to router 12E based on the list of SR-enabled routers. For example, at least routers 12C-12F may use a resource reservation protocol such as the Resource Reservation Protocol with Traffic Engineering extensions (RSVP-TE) to establish RSVP LSP 26. Upon successfully establishing RSVP LSP 26, border router 12C may respond with a reply packet (e.g., an SR-TE MPLS OAM traceroute reply packet) indicating success status to ingress router 12A, and ingress router 12A may continue the regular SR TE MPLS OAM request packet towards the egress, which is 12G. Upon successfully receiving SR TE MPLS OAM reply packet from egress 12G, the ingress router 12A may establish an SR-TE policy for an end-to-end SR LSP 24 from ingress router 12A to egress router 12G that tunnels through RSVP LSP 26. Ingress router 12A may also make the dynamic SR-TE policy active and install it in an appropriate routing table in ingress router 12A.

In some examples, routers 12C-12F may establish RSVP-TE LSP 26 based on constraint information about links within network 14 including, for example, reserved bandwidth availability, link color, Shared Risk Link Group (SRLG), and the like. RSVP-TE may use reserved bandwidth availability information accumulated by route advertisements from the ISIS protocol or the OSPF protocol to configure RSVP LSP 26. After computing RSVP LSP 26, RSVP-TE may send a Path message for establishing RSVP LSP 26. RSVP-TE establishes LSPs that follow a single path from router 12C to router 12F, and all network traffic sent on RSVP LSP 26 must follow exactly that path. Further examples of RSVP-TE are described in D. Awduche et. al, "RSVP-TE: Extensions to RSVP for LSP Tunnels," Request for Comments 3209, December 2001, the entire contents being incorporated by reference herein.

In this way, ingress router 12A may dynamically trigger the creation of RSVP-TE LSP 26 between a first border router and a second border router of a network when one or more routers within the network are not enabled for SR as needed. This avoids having to manually configure a resource reservation LSP when needed, or configure resource reservation LSPs between every border device combination, which may be tedious, unscalable, and unnecessary.

In other examples, non-SR LSPs are established between all border routers of a network during IGP shortest path calculation. For example, during its shortest path first (SPF) calculation border router 12C may initiate RSVP LSP 26 (or another non-SR LSP) to border router 12F (e.g., as described above). In some examples, RSVP LSP 26 may not be established if a RSVP-TE tunnel already exists for that path. Border router 12C may initiate a resource reservation LSP to border router 12H during its SPF calculation.

Figure 2:
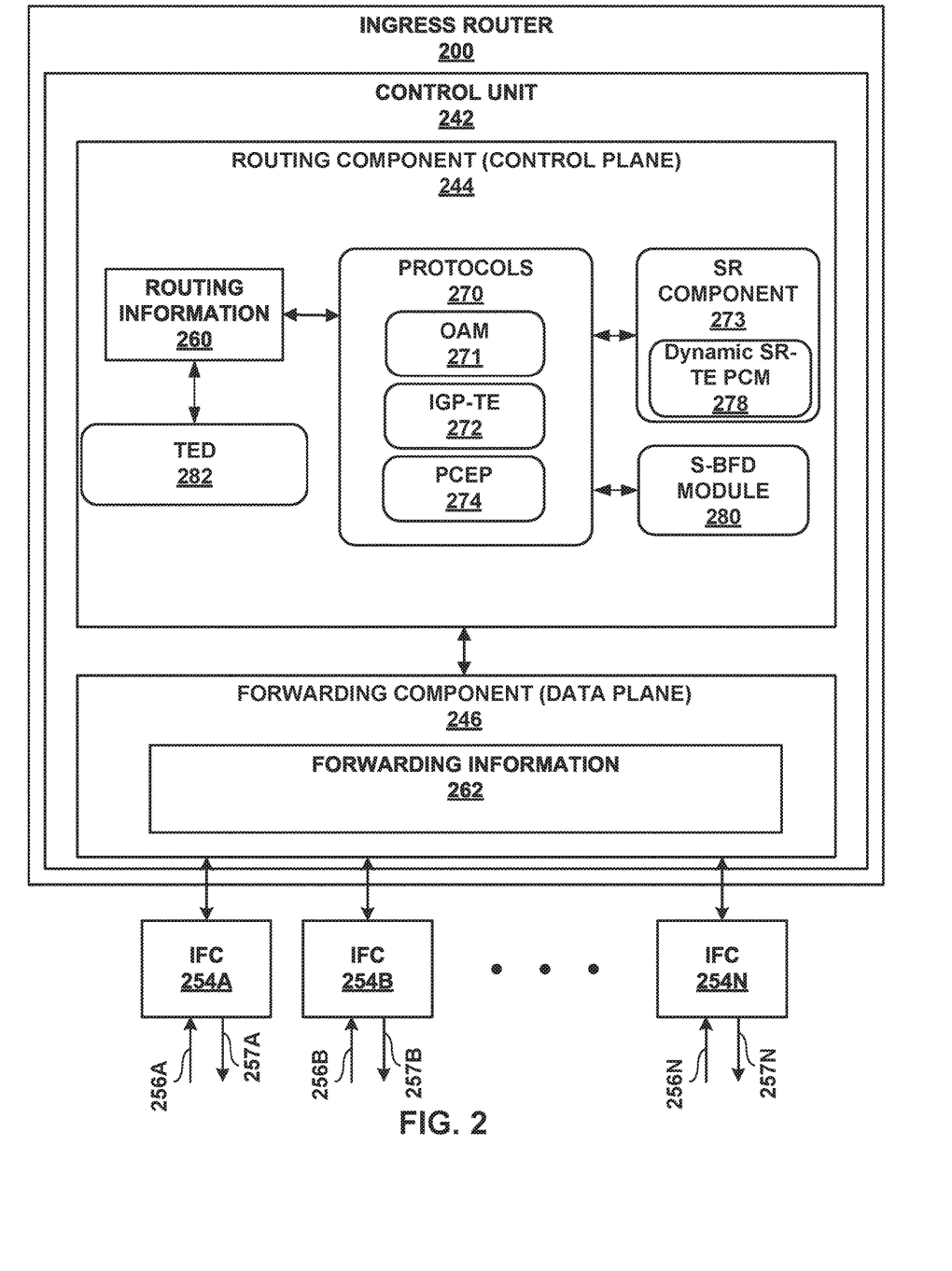
FIG. 2 is a block diagram illustrating an example ingress router capable of operating in accordance with the techniques described herein.

FIG. 2 is a block diagram illustrating an example ingress router 200 that performs various aspects of the techniques described in this disclosure. Router 200 may represent ingress router 12A of FIG. 1, for example. While described with respect to router 200, the techniques may be implemented by any other type of network device capable of implementing at least routing protocols including a resource reservation protocol or segment routing protocol. Thus, while described with respect to router 200, the techniques should not be limited to router 200 described with respect to the example of FIG. 2. In some examples, ingress router 200 may be referred to as ingress device 200.

In the example of FIG. 2, ingress router 200 includes interface cards 254A-254N ("IFCs 254") that receive and send data units, such as packet flows, via network links 256A-256N and 257A-257N, respectively. Ingress outer 200 may include a chassis (not shown) having a number of slots for receiving a set of cards, including IFCs 254. Each card may be inserted into a corresponding slot of the chassis for electrically coupling the card to routing component 244 via high-speed switch (not shown), which may include, for example, switch fabric, switchgear, a configurable network switch or hub, or other high-speed switching mechanisms. IFCs 254 may be coupled to network links 256A-256N and 257A-257N via a number of physical interface ports (not shown). Generally, IFCs 254 may each represent one or more network interfaces by which router 200 may interface with links of a network.

In general, ingress router 200 may include a control unit 242 that determines routes of received packets and forwards the packets accordingly via IFCs 254. In the example of FIG. 2, control unit 242 includes routing component 244 (control plane) that configures and controls packet forwarding operations applied by packet forwarding component 246 (data plane).

Routing component 244 provides an operating environment for various routing protocols 270 that execute at different layers of a network stack. Routing component 244 is responsible for the maintenance of routing information 260 to reflect the current topology of a network and other network entities to which router 200 is connected. In particular, routing protocols periodically update routing information 260 to accurately reflect the topology of the network and other entities based on routing protocol messages received by router 200. The protocols may be software processes executing on one or more processors. For example, routing component 244 includes network protocols that operate at a network layer of the network stack, which are typically implemented as executable software instructions.

In the example of FIG. 2, protocols 270 may include OAM 271 to generate MPLS OAM traceroute packets (e.g., the request packet described above with respect to FIG. 1), IGP-TE 272 to implement an IGP protocol with traffic engineering extensions to exchange link state information, and facilitate forwarding of packets or other data units between endpoint devices. For example, routing component 244 may use OAM 271 to generate a request packet to trigger the creation of a RSVP-LSP (e.g., as described in further detail below). In some examples, IGP-TE component 272 may include an OSPF routing protocol in accordance with one or more of the RFC 2328, by J. Moy, entitled "OSPF Version 2," dated April 1998, RFC 5340, by R. Coltun et al. entitled "OSPF for IPv6," dated July 2008, RFC 6845, by N. Sheth et al., entitled "OSPF Hybrid Broadcast and Point-to-Multipoint Interface Type," dated January 2013, and Internet Draft for the Network Working Group, by A. Lindem et al., entitled "OSPFv3 LSA Extendibility," dated July 2013, draft-acee-ospfv3-lsa-extend-01.txt, each of which are incorporated by reference as if set forth in their respective entireties. In some examples, IGP-TE component 272 may include an IS-IS routing protocol that implements an IGP for exchanging routing and reachability information within a routing domain in accordance with RFC 1142, by D. Oran, entitled "OSI IS-IS Intra-domain Routing Protocol," dated February 1990, which is incorporated by reference in its entirety. IGP-TE 272 component may include traffic extensions that support traffic engineering with Multi-protocol Label Switching (MPLS), as described in Internet Draft for Network Working Group, by Tony Li et al., entitled "IGP Requirements for Traffic Engineering with MPLS," dated February 1999, draft-li-mpls-igp-te-00.txt, which is incorporated by reference in its entirety.

Protocols 270 may also include configuration protocols. For example, protocols 270 may include PCEP 274 in accordance with RFC 5440, by JP. Vasseur, Ed., et al, entitled "Path Computation Element (PCE) Communication Protocol (PCEP)," dated March 2009, or NETCONF (not shown) in accordance with RFC 6241, by R. Enns, Ed., et al., entitled "Network Configuration Protocol (NETCONF)," dated June 2011, each of which is incorporated by reference in its entirety. Protocols 270 may include other routing protocols (not shown), such as routing information protocol (RIP), border gateway protocol (BGP), or any other network protocols.

Routing component 244 may include a Traffic Engineering Database (TED) 282 for storing, e.g., path information for segment routed LSPs. TED 282 may also include segment identifier information. TED 282 may be in the form of a variety of data structures, such as a number of tables, link lists, radix trees, databases, flat files, or other data structures.

In this example, routing component 244 further includes a segment routing (SR) component 273 to implement segment routing techniques for IGP protocols (e.g., IS-IS and OSPF) for specifying how router 200 may advertise node or adjacency labels (e.g., to support a SPRING or other SR protocol). As described in FIG. 1, these node or adjacency labels may steer a packet through a controlled set of instructions, called segments, by prepending the packet with a segment routing header. SR component 273 may include dynamic SR-TE path computation module (PCM) 278 configured to invoke OAM 271 to output an OAM message that causes a border router to dynamically establish a resource reservation LSP through one or more routers that are not enabled for SR.

By executing the routing protocols, routing component 244 identifies existing routes through the network and determines new routes through the network. Routing component 244 stores routing information 260 that includes, for example, routes through the network (e.g., in routing tables). In some examples, routing information 260 includes RSVP-LSP information. Forwarding component 246 stores forwarding information 262 that includes destinations of output links 257. Forwarding information 262 may be generated in accordance with routing information 260. In some examples, forwarding information 262 stores labels and associated next hops.

Ingress router 200 may receive a colored service route with protocol next hop (PNH) for a destination device (e.g., egress router 12G of FIG. 1). For example, egress router 12G may broadcast BGP/virtual private network (VPN) routes to ingress router 200. In response, SR-TE PCM 278 may determine that an entry for the destination device specified as the PNH is not in routing information 260 of ingress router 200 and that there is no contiguous SR-TE path between ingress router 200 and the destination device. For example, SR-TE PCM 278 may compute, based on routing information 260 and/or TED 282, a potential path between ingress router 200 and the destination device having one or more routers along the path that are not enabled for SR.

In response to determining there is no contiguous SR-TE path between ingress router 200 and the destination device, SR-TE PCM 278 invokes OAM 271 to generate a request packet that includes data to enable the creation of a dynamic SR-TE policy through the network with one or more routers that are not enabled for SR (e.g., as describe below with reference to FIG. 4). For example, SR-TE PCM 278 may pass OAM 271 a list of loose hops (e.g., an ERO that specifies one or more routers enabled for SR as loose hops from routing information 260) from ingress router 200 to the destination device. OAM 271 may generate the request packet (e.g., a SR-TE MPLS OAM packet) that includes the list of loose hops for the SR-TE policy, an indication (e.g., a flag) to trigger the creation of a resource reservation LSP through one or more routers that are not enabled for SR. SR-TE PCM 278 may then forward the request packet to a border router (e.g., a border router listed in the request packet).

OAM 271 may subsequently receive an OAM reply packet corresponding to the OAM request packet, which may have a flag set indicating it is a reply packet for successful establishment of the requested resource reservation LSP. In response to subsequently receiving a reply packet from the border router with a success status, SR-TE PCM 278 may verify that the resource reservation LSP was successfully created. For example, SR-TE PCM 278 may invoke OAM 271 to generate and forward (e.g., serially or sequentially) OAM traceroute packets to each of the other routers along the computed path (e.g., routers 12D, 12E, 12F, and 12G in FIG. 1) to determine whether the resource reservation LSP was successfully created. In response to receiving a reply packet with a success status from the border router and a reply OAM packet from each of the other routers along the computed path, SR-TE PCM 278 may generate a SR-TE policy, make the policy active, and install the policy within routing information 260. For example, SR-TE PCM 278 may establish an end-to-end SR LSP from ingress router 200 to the destination device that tunnels through resource reservation LSP created by the border router of the network for the SR-TE policy. In response to receiving a reply packet with a failure status from the border router or any other router along the computed path, SR-TE PCM 278 may invoke OAM 271 to generate another request packet (e.g., with the same or different list of loose hops) and forward the packet to a border router (e.g., the same border router or a different border router of the network with the same or different list of loose hops). In some examples, SR-TE PCM 278 may re-forward the same request packet to the border router in response to receiving a reply packet with a failure status from the border router. In some examples, if the resource reservation LSP is not established, OAM 271 may not receive a reply packet from the border router or one of the other routers along the computed path within a configured time period, the absence of which SR-TE PCM 278 may interpret as a failure to establish the resource reservation LSP.

In some examples, ingress router 200 may receive a colored service route with PNH for a destination device, and SR-TE PCM 278 may determine that an entry for destination device does not exist in routing information 260 and that there is a continuous SR-TE path between ingress router 200 and the destination device. In response to these determinations, SR-TE PCM 278 may compute the SR-TE policy to the destination device based on the shortest path between ingress router 200 and the destination device. For example, SR-TE PCM 278 may obtain the shortest path between ingress router 200 and the destination device from routing information 260 and dynamically create a SR-LSP based on that path to the destination device (e.g., without having to tunnel or even create RSVP LSP 26 of FIG. 1). Once the SR-TE policy is computed (e.g., SR-LSP 24 is created), ingress router 200 may make the SR-TE policy active and install it in a routing table within TED 282 or routing information 260.

Routing component 244 may also include a seamless Bidirectional Forwarding Detection (S-BFD) module 280 for running a S-BFD session over SR LSPs and/or RSVP LSPs. In some examples, in response to detecting a failure, S-BFD module 280 may cause OAM 271 to generate an MPLS OAM packet to locate a cause of the failure. Once the location of the failure is detected, S-BFD module 280 may cause SR-TE PCM 278 to compute a new SR-TE policy, e.g., avoiding the link or router the caused the failure.

Although described for purposes of example with respect to a router, ingress router 200 may be more generally a network device having routing functionality, and need not necessarily be a dedicated routing device. The architecture of ingress router 200 illustrated in FIG. 2 is shown for example purposes only. The techniques of this disclosure are not limited to this architecture. In other examples, ingress router 200 may be configured in a variety of ways. In one example, some of the functionally of control unit 242 may be distributed within IFCs 254. In another example, control unit 242 may include a plurality of packet forwarding engines operated as slave routers.

Control unit 242 may be implemented solely in software, or hardware, or may be implemented as a combination of software, hardware, or firmware. For example, control unit 242 may include one or more processors that execute program code in the form of software instructions. In that case, the various software components/modules of control unit 242 may include executable instructions stored on a computer-readable storage medium, such as computer memory or hard disk.

Figure 3:
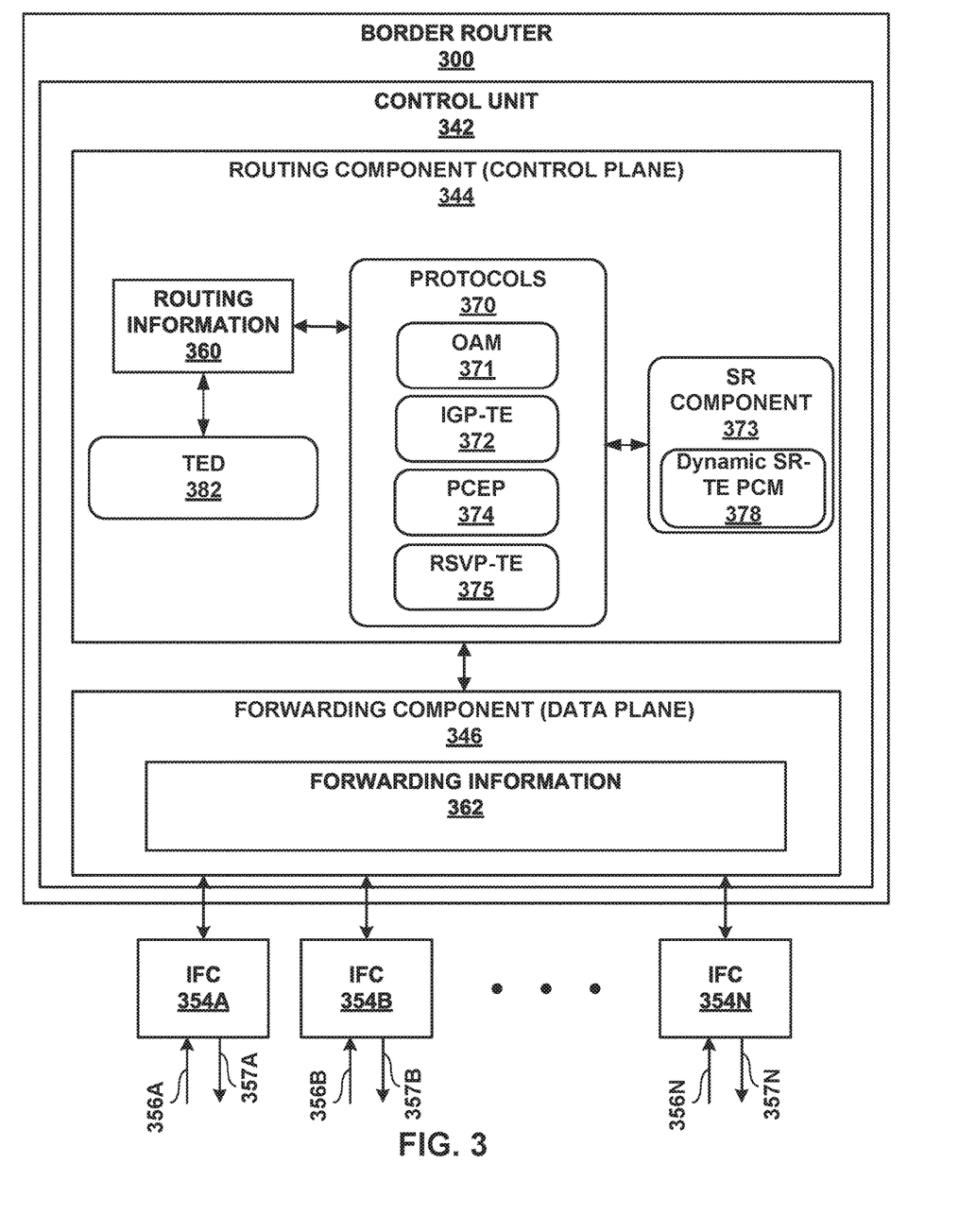
FIG. 3 is a block diagram illustrating an example border router capable of operating in accordance with the techniques described herein.

FIG. 3 is a block diagram illustrating an example border router 300 that performs various aspects of the techniques described in this disclosure. Border router 300 is an RSVP/SR border router and may represent border router 12C of FIG. 1, for example. While described with respect to border router 300, the techniques may be implemented by any other type of network device capable of implementing at least routing protocols including a resource reservation protocol or segment routing protocol. Thus, while described with respect to border router 300, the techniques should not be limited to border router 300 described with respect to the example of FIG. 3. In some examples, border router 300 may be referred to as border device 300.

In the example of FIG. 3, router 300 includes interface cards 354A-354N ("IFCs 354") that receive and send data units, such as packet flows, via network links 356A-356N and 357A-357N, respectively (e.g., these components may operate substantially similar to IFCs 254 and network links 256A-3256N and 257A-257N as described above with reference to FIG. 2). Router 300 may include a chassis (not shown) having a number of slots for receiving a set of cards, including IFCs 354 (e.g., as described above with reference to FIG. 2). IFCs 354 may be coupled to network links 356A-356N and 357A-357N via a number of physical interface ports (not shown). Generally, IFCs 354 may each represent one or more network interfaces by which router 300 may interface with links of a network (e.g., network 14 of FIG. 1).

In general, border router 300 may include a control unit 342 that determines routes of received packets and forwards the packets accordingly via IFCs 354. In the example of FIG. 3, control unit 242 includes routing component 344 (control plane) that configures and controls packet forwarding operations applied by packet forwarding component 346 (data plane).

Routing component 344 provides an operating environment for various routing protocols 370 that execute at different layers of a network stack. Routing component 344 is responsible for the maintenance of routing information 360 to reflect the current topology of a network and other network entities to which router 300 is connected. In particular, routing protocols periodically update routing information 360 to accurately reflect the topology of the network and other entities based on routing protocol messages received by router 300 (e.g., as described above with reference to FIG. 2).

In the example of FIG. 3, protocols 370 may include OAM 371 to receive, process, and generate MPLS OAM traceroute packets (e.g., to receive and process request packets to generate reply packets), IGP-TE 372 to implement an IGP protocol with traffic engineering extensions to exchange link state information, and facilitate forwarding of packets or other data units between endpoint devices. In some examples, IGP-TE component 372 may include an OSPF routing protocol (e.g., as described above with reference to FIG. 2). In some examples, IGP-TE component 372 may include an IS-IS routing protocol that implements an IGP for exchanging routing and reachability information within a routing domain (e.g., as described above with reference to FIG. 2). IGP-TE 372 component may include traffic extensions that support traffic engineering with MPLS, as described in Internet Draft for Network Working Group, by Tony Li et al., entitled "IGP Requirements for Traffic Engineering with MPLS," dated February 1999, draft-li-mpls-igp-te-00.txt, which is incorporated by reference in its entirety.

In the example of FIG. 3, protocols 370 may include Resource Reservation Protocol with Traffic Extensions (RSVP-TE) protocol 375 to establish RSVP-TE LSPs (e.g., RSVP LSP 26 of FIG. 1). For example, routing component 344 may use RSVP-TE 375 to generate and send Path and Resv messages for establishing RSVP LSPs. Protocols 370 may also include configuration protocols. For example, protocols 370 may include PCEP 374, NETCONF, or any other network protocols as described above with reference to FIG. 2.

In this example, routing component 344 includes a segment routing (SR) component 373 to implement segment routing techniques for IGP protocols (e.g., IS-IS and OSPF) for specifying how router 300 may advertise node or adjacency labels (e.g., as described above with respect to FIG. 2). In some examples, border router 300 may also support a SPRING protocol or any other SR protocol. SR component 373 may include dynamic SR-TE path computation module (PCM) 378 configured to invoke RSVP-TE 375 to create a resource reservation LSP along a path of one or more routers that are not enabled for SR, in accordance with the techniques of this disclosure.

By executing the routing protocols, routing component 344 identifies existing routes through the network and determines new routes through the network. Routing component 344 stores routing information 360 that includes, for example, routes through the network. In some examples, routing information 360 includes RSVP-LSP information. Forwarding component 346 stores forwarding information 362 that includes destinations of output links 357. Forwarding information 362 may be generated in accordance with routing information 360. In some examples, forwarding information 362 stores labels and associated next hops. In other examples, label information may be stored in a separate label forwarding information base (LFIB) (not shown).

Routing component 344 may include a Traffic Engineering Database (TED) 382 for storing e.g., path information for segment routed LSPs. TED 382 may also include segment identifier information. TED 382 may be in the form of a variety of data structures, such as a number of tables, link lists, radix trees, databases, flat files, or other data structures. Router 300 may rely on information in TED 382 to provide resource reservation protocol reservations.

Although described for purposes of example with respect to a router, border router 300 may be more generally a network device having routing functionality, and need not necessarily be a dedicated routing device. The architecture of border router 300 illustrated in FIG. 3 is shown for example purposes only. The techniques of this disclosure are not limited to this architecture. In other examples, border router 300 may be configured in a variety of ways. In one example, some of the functionally of control unit 342 may be distributed within IFCs 354. In another example, control unit 342 may include a plurality of packet forwarding engines operated as slave routers.

Control unit 342 may be implemented solely in software, or hardware, or may be implemented as a combination of software, hardware, or firmware. For example, control unit 342 may include one or more processors that execute program code in the form of software instructions. In that case, the various software components/modules of control unit 342 may include executable instructions stored on a computer-readable storage medium, such as computer memory or hard disk.

In accordance with techniques of this disclosure, border router 300 may receive an OAM request packet (e.g., an MPLS OAM packet from ingress router 200). The OAM request packet may include a TTL value that causes forwarding component 346 to send the packet to control plane 344 for processing. In response to receiving the request packet, OAM 371 may detect the indication to trigger dynamic creation of an RSVP LSP through RSVP-enabled devices and a list of SR-enabled routers as loose hops, such as by determining that the relevant flag is set. In response to determining the flag is set to trigger creating of an RSVP LSP, and in response to determining that border router 300 is itself a border router, RSVP-TE module 375 may then initiate a dynamic RSVP-TE LSP from border router 300 to a destination device based on the packet information (e.g., the list of SR enabled routers).

For example, RSVP-TE module 375 may use RSVP-TE 371 to generate a Path message based on the ERO contained in the OAM request packet, which specifies a list of SR-enabled devices toward a destination device. RSVP-TE module 375 may include in the Path message the ERO received in the OAM request packet. In this manner, RSVP-TE module 375 dynamically establishes a resource reservation LSP across the non-SR-enabled routers from border router 300 to another border router (e.g., RSVP-TE LSP 26 from border router 12C to border router 12F as shown in FIG. 1) based on the received OAM packet. In this way, a segment routed LSP may tunnel through the resource reservation LSP automatically created by border router 300.

In some examples, routing component 344 may be configured to store an indication that border router 300 is a border router, i.e., that border router 300 has detected at least one interface coupling itself to a router enabled for segment routing and not for RSVP-TE, and at least one interface coupling itself to a router that is enabled for RSVP-TE, and not for segment routing. In some examples, routing component 344 may store this indication as part of routing information 360 or TED 382. The information of what its neighboring routers are enabled for may be received by IGP messages, for example. The presence of this indication of border router status may be a precondition for OAM 371 to act upon the flag set in the OAM request packet by passing the ERO in the OAM request packet to RSVP-TE module 375. In some examples, a router may start out as a border router but may transition to a non-border router (or the reverse), such as when an overall network is in the process of being migrated from an RSVP-only network to a mixed network having some SR-enabled devices and some RSVP-enabled devices, to a network having SR-enabled devices only. Such migration may occur in phases.

Border router 300 may use MPLS traffic engineering shortcuts to facilitate stitching of SR and RSVP labels when packet traffic is routed to border router 300 via the dynamic SR-TE policy. For example, forwarding component 246 may use the resource reservation LSP to stich SR labels together. For example, border router 300 may have traffic engineering properties configured for IGP-TE 372 such that traffic engineering shortcuts are enabled. With traffic engineering shortcuts enabled, when there is an RSVP LSP toward a destination device prefix (as is the case after RSVP LSP 26, IGP-TE 372 installs the prefix in routing information and uses the RSVP LSP 26 as a next hop for reaching the prefix. In this way, ingress router 200 uses RSVP LSP 26 along the path to reach the destination. In the case of IPv6 routes running over the RSVP LSP 26, IGP-TE 372 ensures that IPv6 routes running over the RSVP LSP 26 are correctly de-encapsulated at the tunnel egress by pushing an extra IPv6 explicit null label between the IPv6 payload and the IPv4 transport label.

Upon detecting the resource reservation LSP has been established through the RSVP-enabled network devices, such as by RSVP-TE module 375 receiving a Resv message for RSVP LSP 26, OAM 371 may generate an OAM reply packet indicating a success status. For example, the OAM reply packet may have a flag set indicating it is a reply packet for indicating successful establishment of a requested resource reservation LSP. If the resource reservation LSP is not successfully created, in some examples OAM 371 may generate and forward an OAM reply packet indicating a failure status to ingress router 200 (e.g., an error message). In some examples, if the resource reservation LSP is not established, OAM 371 may not send a reply packet at all, the absence of which the ingress router 200 will interpret as a failure to establish the resource reservation LSP.

In an other example approach, border router 300 may be configured to automatically establish RSVP-TE tunnels between all RSVP/SR border routers during IGP shortest path calculation. In this example, an SR-capable router is configured to initiate an RSVP-TE tunnel to another SR-capable node, if its next-hop to that node is not SR capable and also the previous hop to the node is not SR capable. Such a new RSVP-tunnel may not be established if one already exists. SR component of the ingress router then installs routes in the appropriate portion of its routing information (e.g., a colored route) and traffic to the SR destinations through the border router 300 will be sent over the pre-established RSVP-TE LSP using IGP-TE shortcuts. In this example, border routers will dynamically create a full mesh of RSVP-TE LSPs as the border routers are identified based on the sharing of shortest path first (SPF) information. Although this results in a full mesh of RSVP-TE LSPs rather than an on-demand creation, this approach has the benefit of avoiding manual configuration of RSVP LSPs and end-to-end SR policies across an area of RSVP-only network.

Figure 4:
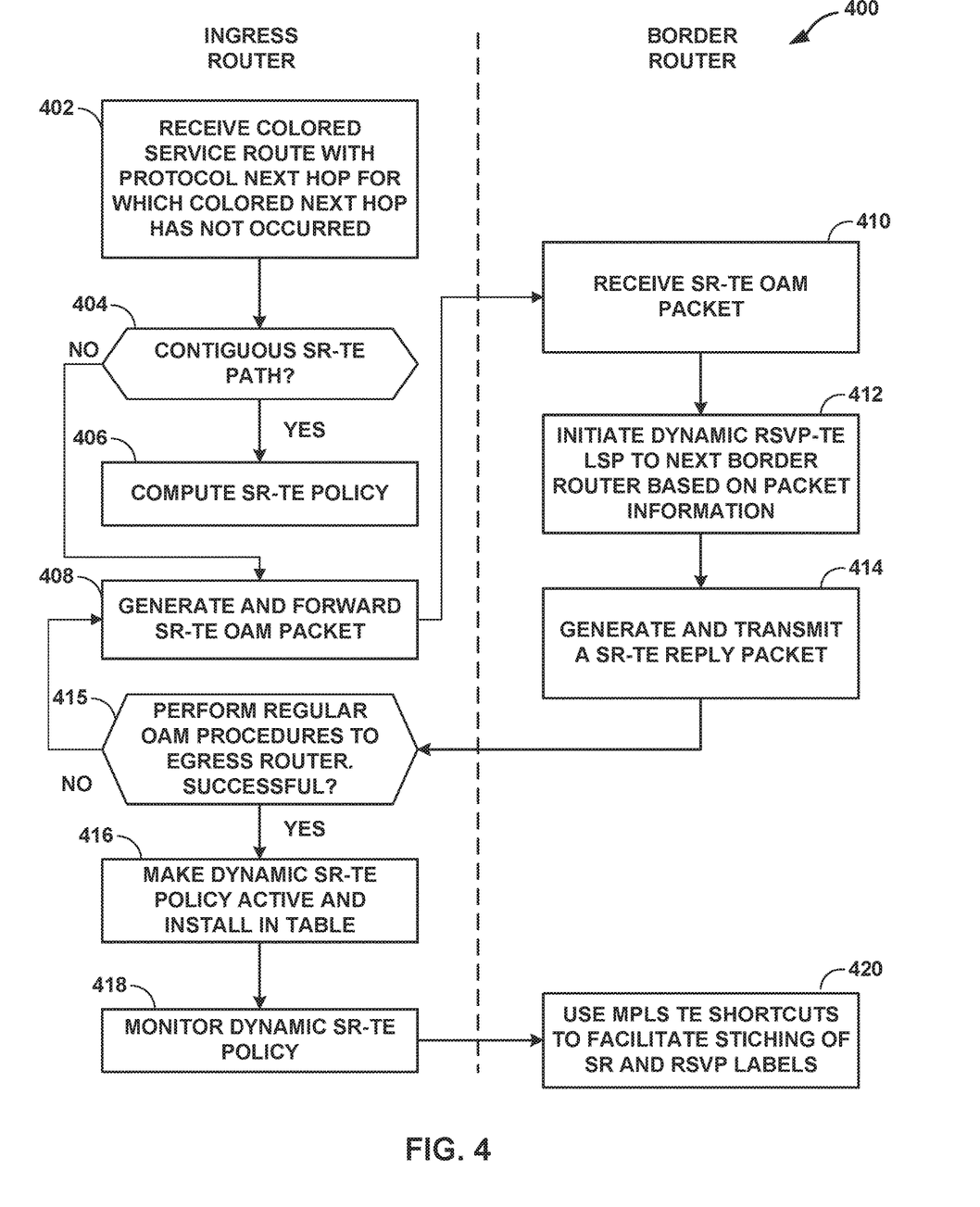
FIG. 4 is a flowchart illustrating an example operation for dynamically computing a segment routing for traffic engineering (SR-TE), in accordance with the techniques of this disclosure.

FIG. 4 is a flowchart 400 illustrating an example operation for dynamically computing a segment routing for traffic engineering (SR-TE) policy, in accordance with the techniques of this disclosure. In particular, the dynamic SR-TE policy tunnels a segment routed LSP through a resource reservation LSP. FIG. 4 will be explained with reference to ingress router 12A (which corresponds to ingress router 200 of FIG. 2) and border router 12C (which corresponds to border router 12C 300 of FIG. 3) of FIG. 1.

Ingress router 12A may receive a colored service route with protocol next hop (PNH) for which colored next hop resolution has not yet occurred (402). For example, ingress router 12A may receive a service route that includes a network prefix or a network address of a destination device (e.g., a destination address of egress router 12G of FIG. 1) and ingress router 12A may determine that an entry for that prefix or destination device is not stored in a routing table of ingress router 12A. In response, ingress router may determine whether there is a contiguous SR-TE path between ingress router 12A and the destination device (e.g., based on information about routers 12 in routing information 260 of FIG. 2) (404). A contiguous SR-TE path is a path in which all network devices within that path are enabled for SR. In response to determining that all of the network devices within the path are enabled for SR, ingress router 12A may compute an ST-TE policy for forwarding network traffic from ingress router 12A to the destination device (406). For example, ingress router 12A may store the shortest path from ingress router 12A to egress router 12G and dynamically create the SR-LSP 24 to router 12G, as shown in FIG. 1. Once the SR-TE policy is computed, ingress router 12A may make the SR-TE policy active and install it in a routing table.

In response to determining that not all of the network devices within the path are enabled for SR, ingress router 12A may generate and forward a request SR-TE packet toward the destination device that will trigger the generation of a dynamic RSVP LSP through the network devices that are not enabled for SR (408). For example, ingress router 12A may generate a traceroute packet (e.g., a SR-TE MLPS OAM traceroute packet) to include a list of SR-enabled network devices (e.g., routers 12B, 12C, 12F, and/or 12G), e.g., an ERO specifying the SR-enabled network devices as loose hops, and an indication (e.g., a flag) for creating a dynamic LSP through the network devices that are not enabled for SR (e.g., dynamic RSVP LSP 26 through routers 12D and/or 12E of FIG. 1). Ingress router 12A forwards that SR-TE packet to border router 12C (e.g., via router 12B). While FIG. 1 shows one router between ingress router 12A and border router 12C, in other examples, fewer or more routers may be between the ingress and border routers.

Border router 12C may receive the SR-TE packet from ingress router 12A (e.g., via router 12B) (410). In some examples, the TTL value of the SR-TE packet will be expired and the SR-TE packet will go up to control plane of border router 12C for processing (e.g., as described above with reference to FIG. 3). In response to receiving the SR-TE MPLS OAM request packet, the control plane of border router 12C may detect the indication for creating a dynamic RSVP LSP 26 and the list of SR-enabled routers (e.g., routers 12C and 12E) as loose hops. Border router 12C may store data indicating that it is a border router and will initiate a dynamic RSVP-TE LSP from border router 12C to border router 12E based on the packet information (e.g., the list of SR enabled routers as loose hops) in response to detecting the indication and the list of SR-enabled routers (412). For example, border router 12C may establish RSVP LSP 26 to tunnel across the non-SR-enabled routers 12D and 12E from border router 12C to border router 12E (e.g., from the list of SR-enabled routers). Upon successfully establishing RSVP LSP 26, border router 12C may generate and forward a reply packet indicating a success status to ingress router 12A (e.g., an SR-TE MPLS OAM traceroute reply packet) (414). If RSVP LSP 26 is not successfully created, border router 12C may generate and forward a SR-TE reply packet indicating a failure status to ingress router 12A, or may not reply (414).

Ingress router 12A may receive the SR-TE reply packet from border router 12C and determine whether the RSVP LSP 26 was successfully created (415). For example, ingress router 12A may perform regular OAM traceroute procedures and generate and route (e.g., serially or concurrently) traceroute packets to each of the other routers along the computed path (e.g., routers 12D, 12E, 12F, and 12G in FIG. 1) to determine whether the RSVP LSP 26 was successfully created. In response to receiving a SR-TE reply packet with a success status from border router 12C and a reply OAM packet from each of the other routers along the computed path (YES branch of 415), ingress router 12A may make the computed dynamic SR-TE policy active and install the policy in a routing table of ingress router 12A of FIG. 12A (416). For example, ingress router may establish an end-to-end SR LSP 24 from ingress router 12A to egress router 12G that may tunnel through RSVP LSP 26 for the SR-TE policy. In response to receiving a SR-TE reply packet with a failure status from border router 12C or any other router along the computed path (NO branch of 415), ingress router 12A may return to step 408. In some examples, in response to failing to receive a reply packet within a configured time period from border router 12C or any other router along the computed path at 415, ingress router 12A may return to step 408. Either way, steps 408-416 may be repeated until the RSVP LSP 26 is successfully created (e.g., a reply packet with a success status is received from border router 12C and a reply OAM packet from each of the other routers along the computed path). In some examples, steps 408-416 may be repeated with the same or different border router and/or with the same or different list of SR-enabled network devices. Either way, ingress router 12A will then monitor the dynamic SR-TE policy after it is created (418). For example, ingress router 12A may run a seamless Bidirectional Forwarding Detection (S-BFD) over SR LSP 24 and/or RSVP LSP 26. In some examples, in response to detecting a failure, ingress router may generate an MPLS OAM packet to locate the failure. Once the failure is detected, ingress router 12A may compute a new SR-TE policy around location of the failure. When packet traffic is routed to border router 12C via the dynamic SR-TE policy, border router 12C will use MPLS TE shortcuts to facilitate stitching of SR and RSVP labels (420). For example, border router 12C may use RSVP LSP 26 to stich SR labels together.

In some examples, ingress router 12A may delete the SR policy when no longer needed (e.g., when all service routes are withdrawn), and when it does so, ingress router 12A may send another OAM request packet to the border router having an indication that the RSVP LSP can be torn down.

In response to receiving the OAM request packet indicating that the RSVP LSP can be torn down, the border router tears down the RSVP LSP.

Figure 5:
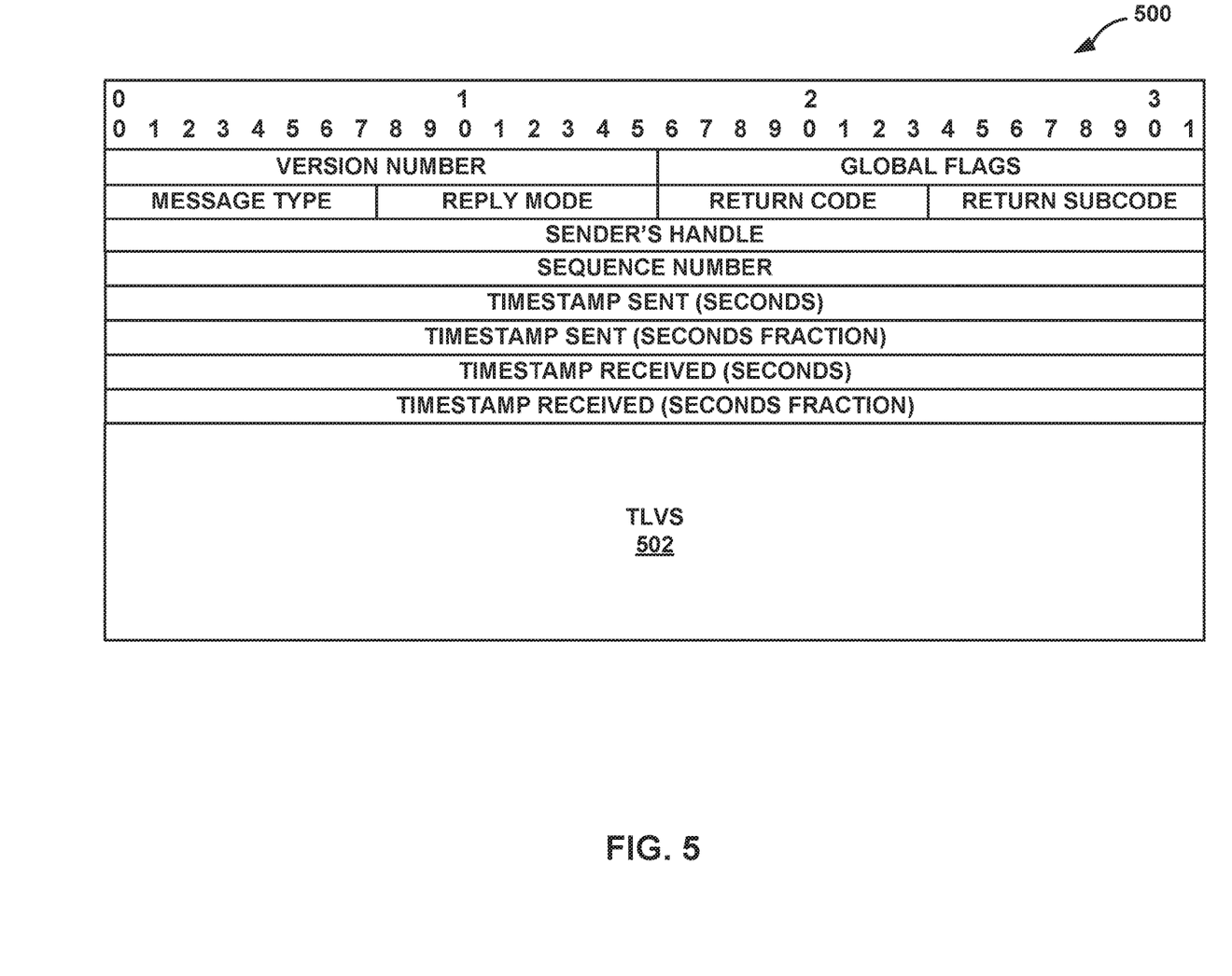
FIG. 5 illustrates an example operations, administrations, and management (OAM) Multi-Protocol Label Switching (MPLS) traceroute packet, in accordance with aspects of the techniques described in this disclosure.

FIG. 5 illustrates an example operations, administrations, and management (OAM) Multi-Protocol Label Switching (MPLS) traceroute packet 500, in accordance with the techniques described in this disclosure. MPLS OAM traceroute packet 500 is one example of the request and/or the reply packets that are generated by ingress router 12A and border 12C, respectively, as described above with reference with to FIG. 4. Further example details of MPLS OAM traceroute packets can be found in RFC 8029, by K. Kompella et. al., entitled "Detecting Multiprotocol Label Switched (MPLS) Data-Plane Failures," dated March 2017, and RFC 8287, by N. Kumar, Ed. et. al., entitled "Label Switched Path (LSP) Ping/Traceroute for Segment Routing (SR) IGP-Prefix and IGP-Adjacency Segment Identifiers (SIDs) with MPLS Data Planes," each of which are incorporated by reference in their respective entireties. For example, RFC 8287 defines three SUB-TLVs for the Target FEC Stack TLV (Type 1), the Reverse-Path Target FEC Stack TLV (Type 16), and the Reply Path TLV (Type 21), which are used for SR. These SUB-TLVs include IPv4 IGP-Prefix Segment ID (Sub-Type 34), IPv6 IGP-Prefix Segment ID (Sub-Type 35), and IGP-Adjacency Segment ID (Sub-Type 36).

As described in RFC 8029, MPLS OAM traceroute packet 500 may include a "Global Flags" subregistry that tracks the assignment of 16 flags in the Global Flags field of the MPLS LSP ping echo request message. The flags are numbered from 0 (most significant bit, transmitted first) to 15. In accordance with techniques of this disclosure, the $12^{th}$ bit (or any other bit) may be used as the flag or indication to trigger the creation of a dynamic resource reservation LSP by a border device (e.g., as described above). This indication or flag may be ignored on intermediate routers (e.g., routers other than border routers or ingress routers). The flag may also be ignored by nodes that do not support the new flag. MPLS OAM traceroute packet 500 may also use TLVs 502 to include the list of SR enabled network devices for use by the border router in creating the dynamic RSVP LSP.

In accordance with the techniques of this disclosure, top-level vendor private TLVs may be used to encode TE parameters for SR paths. For example, TLV types 31744-32767 and 64512-65535 may be used for vendor private use. In some examples, an unused number in this range may be selected to implement the techniques of this disclosure. For example, the first four octets used for a vendor's Structure of Management Information (SMI) Enterprise Code. The remaining octets may be used to encode TE parameters like bandwidth, color and explicit path. Moreover, each traffic engineering parameter can be encoded as sub-TLV, bandwidth can be encoded as in bandwidth parameters in IGP TE extensions (i.e., IEEE floating point notation), color may be defined similar to the one defined in IGP TE extensions, and explicit path can be defined as EROs defined in RSVP-TE specification.

Although the techniques of this disclosure are described for purposes of example in terms of an OAM protocol such as MPLS traceroute, any OAM-type protocol may be used that sends packets that, when received by the forwarding plane of a device, are sent to the control plane of the device, and the control plane sends a reply packet back to the head-end device that initiated sending of the packets.

The techniques described herein may be implemented in hardware, software, firmware, or any combination thereof. Various features described as components, units or modules may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may include a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may include one or more computer-readable storage media.

In some examples, the computer-readable storage media may include non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software components or hardware components.

Various aspects of the techniques have been described. These and other aspects are within the scope of the following claims.

What is claimed is:

1. A method comprising:
    receiving, by a network device, a service route specifying a destination device as a protocol next hop;
    calculating, by the network device in response to determining that a routing table of the network device does not contain an entry for the destination device, a segment routing policy specifying a path toward the destination device;
    determining, by the network device, that one or more network devices of a plurality of network devices along the path specified by the segment routing policy are not enabled for segment routing (SR);
    in response to determining that the one or more network devices along the path are not enabled for SR, generating a packet including an SR node list specifying one or more SR-enabled network devices along the path specified by the segment routing policy and an indication that a non-SR Label Switched Path (LSP) through the one or more network devices is needed; and forwarding, by the network device, the packet along the path specified by the segment routing policy to a border device enabled for SR that is adjacent to at least one of the one or more network devices along the path that are not enabled for SR.

2. The method of claim 1, wherein the SR node list comprises an Explicit Route Object (ERO) that specifies the one or more SR-enabled network devices as loose hops.

3. The method of claim 1, further comprising:
receiving a reply packet from the border device indicating that the non-SR LSP was established; and
in response to receiving the reply packet, adding the entry for the destination device to the routing table, the entry specifying the SR policy.

4. The method of claim 3, further comprising:
in response to receiving the reply packet, monitoring, by the network device, the path specified by the segment routing policy using Seamless Bidirectional Forwarding Detection (S-BFD).

5. The method of claim 4, wherein monitoring the path specified by the segment routing policy comprises running a S-BFD session over the path and through the non-SR LSP.

6. The method of claim 4, further comprising:
in response to detecting, by the monitoring, a failure along the path specified by the segment routing policy, sending an operations, administrations, and management (OAM) Multi-Protocol Label Switching (MPLS) packet to identify a location of the failure; and
computing a new segment routing policy that avoids the location of the failure.

7. The method of claim 3, further comprising:
subsequent to receiving the reply packet, receiving, by the network device, one or more network packets; and
forwarding, by the network device, the one or more network packets using the SR policy.

8. The method of claim 1, wherein the packet including the SR node list comprises an operations, administrations, and management (OAM) Multi-Protocol Label Switching (MPLS) traceroute packet.

9. The method of claim 1, wherein the indication that the non-SR LSP through the one or more network devices is needed comprises a flag in a field of the packet including the SR node list message.

10. The method of claim 9, wherein the field of the packet comprises a global flags field.

11. The method of claim 9, wherein the packet includes the SR node list specifying one or more SR-enabled network devices along the path in a type-length-value field of the packet.

12. A network device comprising processing circuitry coupled to a memory device, wherein the network device is configured to:
receive a service route specifying a destination address as a protocol next hop;
calculate, in response to determining that a routing table of the network device does not contain an entry for the destination address, a segment routing policy specifying a path toward the destination address;
determine that one or more network devices of a plurality of network devices along the path specified by the segment routing policy are not enabled for segment routing (SR);
in response to determining that the one or more network devices along the path are not enabled for SR, generate a packet including an SR node list specifying one or more SR-enabled network devices along the path specified by the segment routing policy and an indication that a non-SR Label Switched Path (LSP) through the one or more network devices is needed; and
forward the packet along the path specified by the segment routing policy to a border device enabled for SR that is adjacent to at least one of the one or more network devices along the path that are not enabled for SR.

13. The network device of claim 12, wherein the SR node list comprises an Explicit Route Object (ERO) that specifies the one or more SR-enabled network devices as loose hops.

14. The network device of claim 12, further configured to:
receive a reply packet from the border device indicating that the non-SR LSP was established; and
in response to receiving the reply packet, add the entry for the destination address to the routing table, the entry specifying the SR policy.

15. The network device of claim 14, further configured to:
in response to receiving the reply packet, monitor the path specified by the segment routing policy using Seamless Bidirectional Forwarding Detection (S-BFD).

16. The network device of claim 15, wherein the network device being configured to monitor the path for the segment routing policy comprises the network device being configured to run a S-BFD session over the path and through the non-SR LSP.

17. The network device of claim 15, further configured to:
in response to detection, by having monitored the path, of a failure along the path specified by the segment routing policy, send an operations, administrations, and management (OAM) Multi-Protocol Label Switching (MPLS) packet to identify a location of the failure; and
compute a new segment routing policy that avoids the location of the failure.

18. The network device of claim 14, further configured to:
subsequent to receiving the reply packet, receive one or more network packets; and
forward the one or more network packets using the SR policy.

19. The network device of claim 12, wherein the packet including the SR node list comprises an operations, administrations, and management (OAM) Multi-Protocol Label Switching (MPLS) traceroute packet.

20. The network device of claim 12, wherein the indication that the non-SR LSP through the one or more network devices is needed comprises a flag in a field of the packet including the SR node list message.

21. The network device of claim 20, wherein the field of the packet comprises a global flags field.

22. The network device of claim 20, wherein the packet includes the SR node list specifying one or more SR-enabled network devices along the path in a type-length-value field of the packet.

* * * * *